United States Patent [19]

Hörtel

[11] 4,073,674
[45] Feb. 14, 1978

[54] METHOD FOR PRODUCTION OF MULTILAYER COMPOSITE PLATE

[76] Inventor: Willy Hörtel, An der B4, 3125 Wesendorf, Germany

[21] Appl. No.: 678,201

[22] Filed: Apr. 19, 1976

[30] Foreign Application Priority Data

Apr. 24, 1975 Germany .......................... 2518174

[51] Int. Cl.² ............................................. B29C 3/00
[52] U.S. Cl. ................................ 156/285; 156/286; 156/310; 156/382; 428/320; 428/322
[58] Field of Search .............. 156/285, 286, 288, 310, 156/381, 382; 428/310, 314, 320, 322; 264/45.1, 46.4

[56] References Cited

U.S. PATENT DOCUMENTS

| | | | |
|---|---|---|---|
| 3,703,422 | 11/1972 | Yoshino | 156/286 |
| 3,785,105 | 1/1974 | Turner | 156/90 |
| 3,912,542 | 10/1975 | Hirano et al. | 156/286 |

FOREIGN PATENT DOCUMENTS

| | | | |
|---|---|---|---|
| 633,463 | 12/1961 | Canada | 156/285 |
| 2,026,593 | 12/1971 | Germany | 156/310 |
| 2,131,256 | 1/1973 | Germany | 156/310 |

*Primary Examiner*—Caleb Weston
*Attorney, Agent, or Firm*—Salter & Michaelson

[57] ABSTRACT

Multilayer composite plate in which a hard layer of a foamed plastics material, such as foamed polystyrene, is bonded between two outer layers, conveniently of plywood or chipboard. The composite plates may have peripheral slots formed by extending the outer layers beyond the edges of the intermediate layer to form flanges. The slots may be used to accommodate ties by which two composite plates abutted edge-to-edge are secured. Invention also concerned with method of bonding layers under partial vacuum and apparatus for performing the method.

3 Claims, 11 Drawing Figures

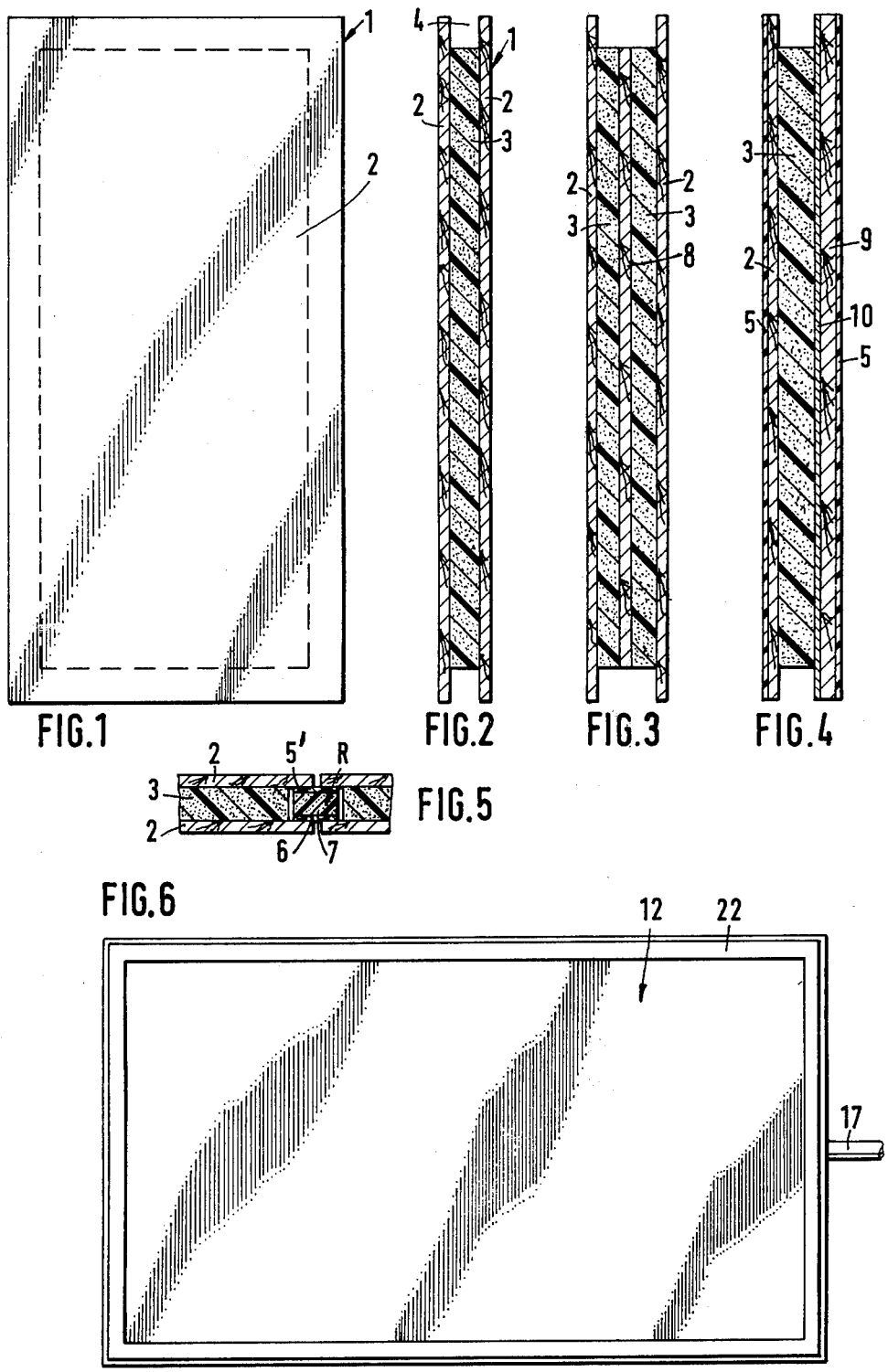

METHOD FOR PRODUCTION OF MULTILAYER COMPOSITE PLATE

The invention concerns a multilayer composite plate having laminar outer layers, preferably wooden and, more particularly, a method and apparatus for production of such multilayer composite plates.

BACKGROUND OF THE INVENTION

The purpose of the invention is to fashion a multilayer composite plate which exhibits a high degree of strength and thermal insulation with little use of material.

SUMMARY OF THE INVENTION

This problem is resolved in accordance with the invention for a multilayer composite plate having laminar outer layers, proferably wooden, by providing an intermediate layer comprising of at least one hard foam layer of foamed plastics material which is adhesively-bonded over substantially the full face area of the intermediate layer to each of the outer layers.

Preferably the hard foam layer is foamed polystyrene.

The hard foam layer may be at least twice as thick as the outer layers.

Chipboard or plywood sheet is preferably used for the outer layers. Use can also be made of asbestos-cement sheet.

Advantageously outer layers may extend beyond the intermediate layer and thus form flanges, whereby the plates are edged with a slot defined by the flanges and the adjacent edge of the intermediate layer, the width of the slot corresponding to the thickness of the foam layer.

In a further development the intermediate layer comprises a stiff plate and a pair of hard foam layers of a foamed plastics material positioned one on each side of said stiff plate, each foam layer being adhesively-bonded over substantially the full face area of the foam layer to the stiff plate and to the adjacent outer layer.

Multilayer composite plates according to the invention have a high bending strength and a high breaking strength. They can therefore be used in building constructions as self-supporting plates and when used as wall elements they can also be subjected to transverse loads. The multilayer composite plates provided by the invention can therefore also perform supporting functions.

By the use of ties which are set in the side slots, large walls can be built without additional support structures. Roof coverings with relatively widely-spaced load-carrying supports are also possible.

The connecting ties may advantageously be formed in the same manner as the multilayer composite plates, namely by outer layers of a stiff laminar material and an intermediate layer of hard foam which is adhesively bonded over substantially its full face to the outer layers. These ties are, like the multilayer composite plates, according to the invention, bad conductors of heat so that large area wall or roof elements can be constructed without thermal bridges between adjacent multilayer composite plates.

A further object of the invention is to provide a method whereby multilayer composite plates and connecting elements therefor can be produced in simple manner. This object is performed in accordance with the invention by the layers being coated over their full contacting face areas with an adhesive bond and then pressed together under partial vacuum. Here a two-component bond may be used with advantage as the adhesive. Expediently the bond may include a filler which has a specific gravity corresponding to the specific gravity of the adhesive.

A simple and effective apparatus for implementation of the foregoing method comprises a stiff forming frame, tightly connected to a firm base, the depth of the forming frame being the appropriate multiple of the thickness of each multilayer composite plate, and the inside dimensions of the forming frame being substantially equal to the corresponding outside dimensions of the multilayer composite plates, the apparatus also including a connection to a sub-atmospheric pressure region, and an elastic cover which can be pressed against the upper edge of the forming frame. Expediently the base of the apparatus is lined with a sealing foil which is tightly clamped peripherally between the base and the forming frame.

With advantage, a peripheral clamping frame for the elastic cover and tightening means whereby the clamping frame is pressed against the forming frame may be provided.

BRIEF DESCRIPTION OF THE DRAWINGS

By way of example the invention is illustrated in and will be described with reference to the drawings, in which:

FIG. 1 shows a multilayer composite plate in plan view;

FIG. 2 is a side view of the plate;

FIGS. 3 and 4 are likewise side elevations of further design forms of multilayer composite plates;

FIG. 5 shows in cross-section a butt joint between two adjoining composite plates;

FIG. 6 shows a plan view of apparatus for the production of multilayer composite plates in accordance with the invention;

DESCRIPTION OF THE PREFERRED EMBODIMENTS

Figure 7:
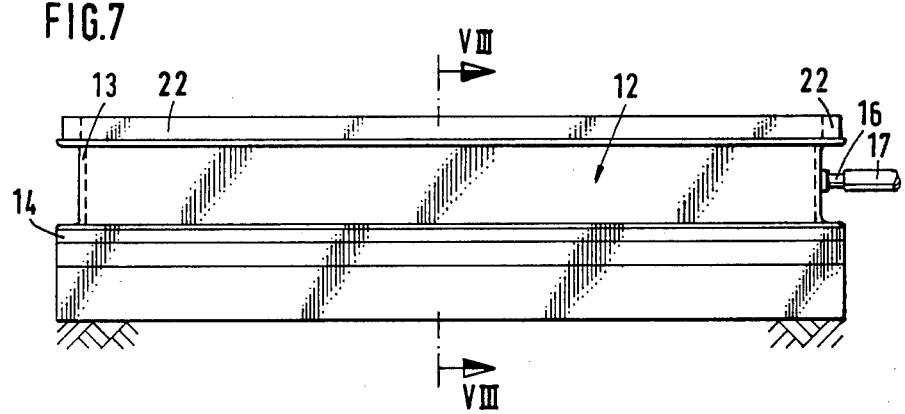
FIG. 7 is a side view of the apparatus shown in FIG. 6.

The multilayer composite plate 1 shown in FIGS. 1 and 2 has two outer layers, the plates 2. Between the plates 2 is a hard foam layer 3 which is adhesively-bonded over its full face to the outer plates 2. The outer plates are with advantage made from wooden material, especially chipboard or plywood sheet. Asbestos-cement sheet can however be used as the outer plates instead.

Advantageously hard foam layers of high raw density are employed, for example, a raw desity of 25 kg/m$^3$. Very satisfactory results are obtained with foamed polystyrene having a raw density greater than 30 kg/m$^3$.

For the full-face bonding, use is preferably made of a two-component adhesive which for volumetric enlargement is compounded with a filler, preferably a talc. The adhesive and the filler should have essentially the same specific gravity in order to avoid deposition of the filler. One method in particular has proved itself for bonding the outer layers to the hard foam layer. By this method the layers are pressed one to another under partial vacuum while the bond hardens. The method will be considered in more detail below.

In the course of experiments either five-ply sheet 12.5 mm in thickness or chipboard 19 mm in thickness was used for the outer plates. In bending tests on a composite plate 40 mm in thickness with a single load at the mid-point of a 1150 mm support interval, failure loads of 2700 and 2520 kg/m plate width respectively and bending strength of $48.5 \times 10^6$ and $44.2 \times 10^6$ kgcm²/m plate width respectively were achieved. Failure loads of at least 35 Mg were obtained in failure tests on multilayer composite plates of 2500 mm length and 1250 mm width with chipboard 19 mm in thickness as the outer layers and an intermediate layer of polystyrene hard foam 60 mm in thickness.

It is clearly possible for the outer layers to be made from different materials, e.g. plywood for one outer layer and chipboard for the other outer layer. In this way optimum strength properties can be achieved. For example, if the plate mounting method is specified, one layer can be selected with regard to the tensile load and the other with regard to the compressive load.

Owing to their excellent strength characteristics, the composite plates according to the invention can in high measure withstand transverse as well as longitudinal stress. The composite plates can therefore be used equally well as load-carrying elements.

As shown in the drawings, the composite plates can with advantage be provided with slots 4 at their edges by extending the outer plates to form flanges, the width of the said slots corresponding to the width of the hard foam layer. In the design variant shown a peripheral slot extending around the whole composite plate is provided. On erection, connecting ties R can be introduced into these slots so that the plates can be abutted edge-to-edge. Advantageously, the ties are, as shown in FIG. 5, constructed like the composite plates, i.e., they are composed of two outer layers, e.g., made from chipboard, 5', 6 and one intermediate layer 7 of hard foam material, the layers here too being bonded full face one to another. If ties of this kind are used, no thermal bridges occur in the region of the joint between neighbouring composite plates as the ties are poor conductors of heat.

In the design variant according to FIG. 3 provision is made within the intermediate layer for an additional layer 8, which can consist of a wooden plate between two hard foam layers 3. Asbestos-cement sheet or the like can however be provided as the layer 8. The composite plate in FIG. 3 then has four bond layers.

The composite plate of FIG. 4 essentially corresponds to that of FIG. 2 in structure. Here a layer 10 of material resistant to vapour diffusion is provided between the right-hand outer layer 9 and the hard foam layer 3. This vapour lock can be a coat of diffusion-resistant material on the inside of the outer layer 9. However it is also possible, for instance, to provide metal foil which is bonded on one side to the outer layer 9 and on the other side to the hard foam layer 3. In FIG. 4 coatings 5 are also shown on the outside of the outer layers 2, 9. These coatings can be the surface treatment for the wooden material used, but foil or the like can also be applied.

In one respect the hard foam layer within the plate serves to ensure adequate thermal insulation. But the moment of resistance of the composite plate also depends on the thickness of the hard foam layer. Therefore given the same outer layers, the load capability of the plate is greater for a hard foam layer of greater thickness.

Figure 8:
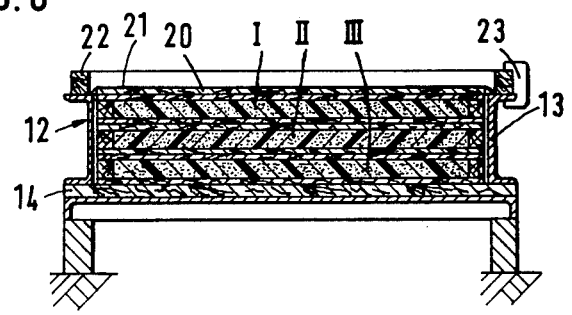
FIG. 8 is a section on the line VIII—VIII in FIG. 7.
Figure 9:
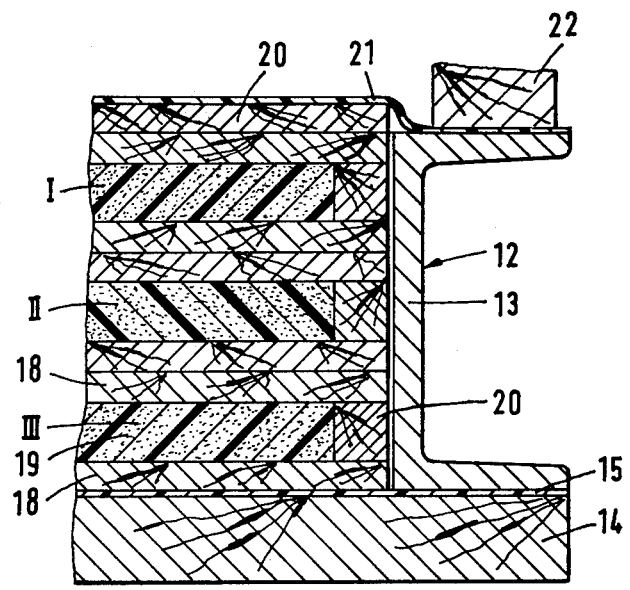
FIG. 9 shows a larger representation of a detail of the apparatus ready for pressing. outer

As mentioned above, the bonding of the outer layers to the intermediate layer of hard foam is advantageously carried out by pressing the layers together under partial pressure after applying the adhesive. This method can be implemented by a simple apparatus which is shown in detail in FIGS. 6 to 9. This apparatus comprises a stiff frame 12 which is preferably welded together from U-sections 13. The frame is connected to a firm base 14 which can for example consist of wooden planks. In order to seal this base, as illustrated in FIG. 9, it can be lined with a sealing foil 15 which is tightly clamped peripherally between the base and the flanges of the U-sections. The frame 12 also has one or several connections 16 which can be coupled to a hose 17 for communication with a region of sub-atmospheric pressure, e.g., a vacuum pump. The inside dimensions of the frame 12 correspond with slight play to the outside dimensions of the composite plate, whereas the height of the frame is essentially the appropriate multiple of the thickness of each composite plate, depending on the number being produced. Owing to the conformity of the inside dimensions of the frame with the outside dimensions of the plate, the individual layers of the composite plates can be held in their pre-set position in relation to each other during the pressing operation, so that displacement is impossible. Clearly it is also possible to centralise the frame by corresponding inserts between the outer edges of the layers of the plates and the inside of the frame. Introduction of the layers of the plates into the frame and the withdrawal of the composite plates are simplified by such centralising pieces. As will be seen especially from FIG. 9, the frame represented in the drawings is designed for simultaneous pressing of three composite plates I, II and III. The respective composite plates have an outer layer 18, preferably of wooden material, and a hard foam layer 19. In this case the dimensions of the respective intermediate layers 19 are less than those of the outer layers 18 by twice the slot depth. Around the periphery of the intermediate layer 19 are introduced wooden ties 24 by which, on the one hand, the intermediate layer 19 is centralised between the outer layers. In addition to this, however, the wooden ties 24 prevent undesired pressing of the edges on the periphery of the intermediate layer. A compensation plate 20 can be laid on the frame-stacked composite plates I, II and III. Finally an elastic cover 21, drawn tightly over the frame, is laid by its edges on the upper arms of the U-sections. As will be seen from FIG. 8, the elastic cover 21 is pressed down at its edges by the all-round pressure frame 22 which can be braced against the upper flange of the U-sections by clamping means, e.g., the clamps 23. Thus the upper edge of the frame can be provided with a covering which promotes sealing action. After having clamped the pressure frame 22, the forming frame is evacuated via the connection 16. Here a partial vacuum of the order 0.4 bar is sufficient, but it can be lower if necessary. At this pressure the plates in the frame are subjected to a pressure of approximately 6000 kg/m². Application of the pressure under partial vacuum has the advantage that no air pockets can form within the bonding layers. In addition to this, however, gases still present in the foam layer are largely removed. The foam layer therefore undergoes artificial ageing and so acquires satisfactory stability of shape.

Multilayer composite plates can be produced in storey height of 2.500 mm and with raster width of 1.250 mm, but much larger dimensions are also possible.

As adhesive has particularly proved as favourable a two-component epoxy resin adhesive with talc as filler. Satisfying consistencies were obtained with the epoxy resin "Rütgers Pox 164 V" of the company Rütgers Werke AG of Frankfurt (Main), Federal Republic of Germany, in connection with the setting agent 91 of the same company.

A preferred mixture consists of:
100 parts epoxy resin
25 parts setting agent
150 parts talc.

This mixture was applied to the outer plates by hand with a roller and with a quantity of 400 g/m$^2$. Then the plates were put together in a vacuum mold and pressed under a vacuum of 0.5 kp/cm$^2$ for a period of approximately 30 minutes, while the adhesive hardened.

For building purposes composite plates as follows are preferably used:

1. for load-bearing outer walls of buildings composite plates with waterproof wood-chip board having a thickness of 19 mm as outer layers and a hard foam layer of polystyrene having a density of 30 kg/m$^3$ and a thickness of 60 mm.

For respective plates having a width of 125 cm and a height of 25 cm vertical loads of at least 5 metric tons are permitted. The failure loads are in the range of 35 metric tons and more. Moreover the plates have an excellent thermal insulation and a good sound reduction.

2. for inside walls of buildings composite plates with five-layer plywood plates having a thickness of 12.5 mm as outer layers and a hard foam layer of polystyrene having a density of at least 25 kg/m$^3$ and a thickness of 40 mm.

3. for roofings composite plates with five-layer plywood plates having a thickness of 12.5 mm as outer layers and a hard foam layer of polystyrene having a density of 30 kg/m$^3$ and a thickness of 60 mm.

These roof plates can be laid self-supporting with span widths of 2.5 m and more.

Figure 10:
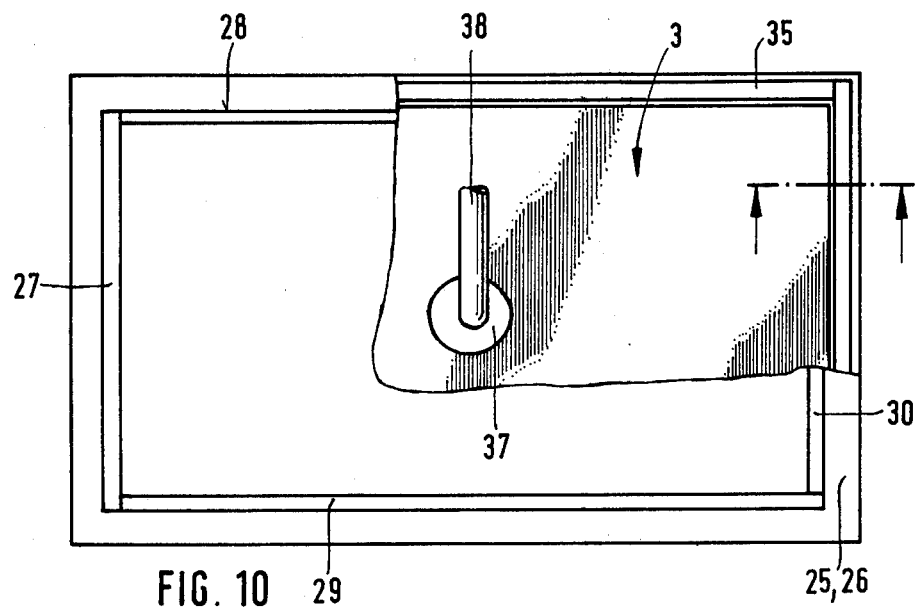
FIG. 10 shows a plan view of a multilayer composite plate.
Figure 11:
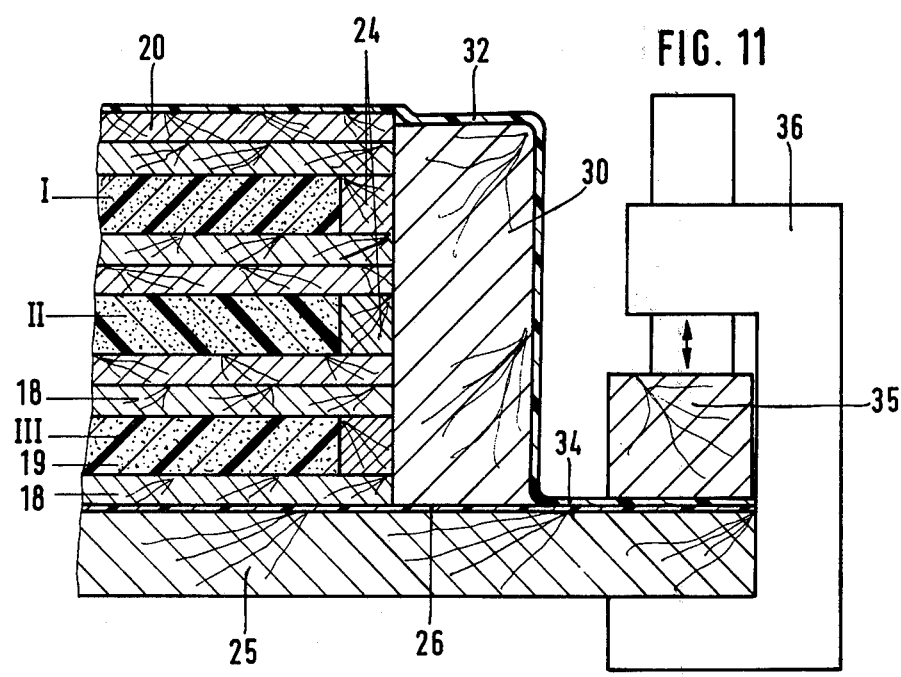
FIG. 11 is a section on the line XI—XI in FIG. 10.

For manufacturing the composite plates a vacuum press has turned out as particularly useful which is shown in FIG. 10 partially broken away in a plan view and in FIG. 11 as section along the line XI—XI in FIG. 10.

The press has a basic plate 25 which is covered by an airtight foil 26. On the upper side of the basic plate a frame with four side walls 27, 28, 29 and 30 is provided. The side walls 27 and 28 are mounted at a right angle to each other on the upper side of the basic plate 25 and are secured to this plate. The side walls 29 and 30 are loose. When putting together the plates to be pressed the outer plates 18 are arranged on the basic plate in that way that they are to lie against the walls 27 and 28. After inserting a lower plate of a composite plate the wooden ties 24 are introduced and the intermediate layer 19 is made fitting against these wooden ties. The composition of the composite plates corresponds to that of the composite plates I to III according to FIG. 9. On the upper composite plate I is laid a compensation plate 20. Finally the walls 29 and 30 are placed on the basic plate fitting against the free sides of the plates being in the mold. These walls are not particularly fixed. Then over the frame with the walls 27 to 30 an elastic cap 32 is put, the vertical clearance of which mainly corresponds to the height of the frame parts 27 to 30 and the inner dimensions of which correspond to the outer dimensions of the frame. At its lower edge the cap is provided with a surrounding flange 34, which is resting on the foil 26 secured to the basic plate 25. Onto the flange are placed pressing pieces of wood 35, which are pressed by the clamps 36. The clamps 36 may be mounted tiltably at the basic plate and the pressing elements may be e.g. pneumatic pistons.

A vacuum connection 37 is preferably arranged approximately in the middle of that part of the cap 32, which is lying over the plate 20. This connection 37 can be connected with a vacuum source by a hose 38. In order to avoid that the connection will become attached to the compensation plate 20 by suction, it is advisable to arrange a sackcloth transversely on the plate 20.

By the press according to FIGS. 10 and 11 a high parallelism of the edges of the composite plates I to III is reached. Moreover it is considerably facilitated to put together the plates in the press and to remove the plates from the press.

What I claim as my invention and desire to secure by Letters Patent of the United States is:

1. A method of producing a multilayer composite plate construction, comprising the steps of laminating at least one hard foam layer of polystyrene having a thickness of at least 40 mm. and a density of at least 25 kp/m$^3$ between outer layers formed of fibrous materials, said outer layers statically absorbing bending tensile and compressive forces when said plate construction is under load, said laminating step including applying a two-component adhesive having talc as a filler to substantially the entire faces of the mating surfaces of said foam and said outer layers, locating said outer layers with said foam therebetween and the adhesive applied thereto in a pressing frame and applying an exterior force to said layers and foam that is sufficient to produce a bonded laminate while simultaneously reducing the pressure in said frame to a partial vacuum to remove the air pockets and gases in the bonding layers and to stabilize the foam layer.

2. A method as claimed in claim 1, comprising the further step of forming a peripheral slot between said outer layers and the foam layer therebetween, and locating a tie of hard foam material in said slot to form a thermal insulator between said outer layers at the peripheries thereof.

3. A method as claimed in claim 1, said adhesive including an epoxy resin that is mixed with said filler and a setting agent.

* * * * *